DIODE LOGIC CIRCUITS

Filed Dec. 22, 1952

INVENTOR
WALTER S. OLIWA
BY William S. Glover
AGENT 2,797,318

DIODE LOGIC CIRCUITS

Walter S. Oliwa, Summit, N. J., assignor to Monroe Calculating Machine Company, Orange, N. J., a corporation of Delaware Application December 22, 1952, Serial No. 327,190

9 Claims. (Cl. 250—27)

This invention relates to switching circuits and more particularly to diode logic circuits for use in electronic computers and the like.

The complexity of electronic computers has led to the development of so-called building block circuits, each adapted to perform one of the logical processes required in a computer and each capable of controlling and/or being controlled by others. For simplicity of coupling and economy, building block circuits are preferably designed for operation at only two potentials, of which one may represent binary one and the other may represent binary zero. Thus, application of one or more input signals of either of said two potentials, when applied to a building block circuit produces an output signal from the latter which is also one of said two potentials. The ideal building block circuit according to the invention is one which operates on a single signal level; that is, it has the same circuit parameters and is controlled by and produces substantially the same alternative potentials no matter where it is located in a cascade of such circuits. Obviously, it is a simple matter to combine these ideal building blocks in an ordered fashion according to their respective functions to build up a logical section of a computer.

Heretofore, diode circuits for performing logical processes, although superior to other circuits in some respects, have been objected to due to the problems attendant upon coupling the same together to perform a series of logical processes. When cascaded known diode circuits perform on a multi-level basis rather than on the described single signal level as do ideal building blocks. In order to maintain the same alternative input-output potentials throughout a series of the known diode logic circuits, each circuit in the series must be especially designed with respect to bias voltages and/or with respect to load or bias resistors. Thus, circuits which perform identical logical functions must utilize different circuit parameters according to their locations in the chain of circuits, and each circuit of the chain operates at a different signal level than the preceding circuit. Additionally, the term "multi-level" is also applicable to known diode circuits in which the alternative, input-output potentials, change substantially from circuit to circuit or from the input to the output of a cascaded chain. Evidently these known diode circuits do not fit the above definition of an ideal building block circuit.

The principle object of the invention, therefore, is the provision of diode logic circuits capable of performing a plurality of logical processes on a single signal level and which fit the above definition for ideal building blocks.

In particular, the invention is directed to the coupling together of logical "and" and "or" diode circuits. By definition, an "or" circuit is one which produces a desired output signal whenever a signal is applied to any one, or more, of its inputs. Conversely, an "and" circuit is one which produces a desired output signal if, and only if, signals are applied to all its inputs simultaneously.

According to the invention, an "and" circuit comprising a diode having a resistor connected to, and an output line extended from, its anode, and an "or" circuit comprising a diode having a resistor connected to, and an output line extended from, its cathode are coupled together by connecting the output line of one to the resistor of the other. The resistors are of substantially the same magnitude and only one is provided in each circuit although more than one diode may be included in each circuit. Further, the number of circuits to be coupled together in a series is not limited to two.

Other objects and features of the invention will become apparent from the following description when read in the light of the drawings of which:

Before entering into a detailed description of the means of the invention, it is deemed desirable first to define certain terms to be used throughout the description. The words "high" and "low" designate potentials of approximately 0 and −20 volts respectively, although it is to be understood that other suitable potentials can readily be substituted therefor. In the logical equations for the circuits to be described the letters $a$, $b$, $c$, etc. represent circuit inputs at a high potential, while the logical connectives "and" and "or" are represented by a dot (.) and a vee ($v$) respectively. For example, the equation $(a.b)vc=H$ indicates a circuit which produces a high output when inputs $a$ and $b$ are high simultaneously, irrespective of the state of $c$, or, when input $c$ is high irrespective of the states of $a$ and $b$.

Figure 1:
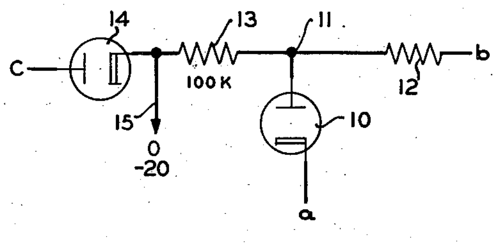
Fig. 1 is a schematic wiring diagram of a diode logic circuit adapted to produce a desired output if signals are applied simultaneously to two inputs thereof or if a signal is applied to a third input thereof.

Referring now to Fig. 1, there is disclosed a diode logic circuit which satisfies the equation $(a.b)vc=H$ discussed above. Input $a$ is applied to the cathode of a diode 10 having its anode connected at 11 to a resistor 12 to which the input $b$ is applied. Diode 10 and resistor 12 comprise an "and" circuit and when input $a$ is low diode 10 becomes non-conducting if input $b$ is also low, but conducts if input $b$ is high. In the latter case current flows between inputs $a$ and $b$, and the potential drop across resistor 12 causes point 11 to assume the low potential of input $a$, that is, substantially −20 volts. In the former case, however, current does not flow and the low potential of input $b$ is applied to point 11. Of course, if the low potential assumed by input $a$ is slightly more negative than that of input $b$, the former appears at point 11.

When input $a$ is high, diode 10 is maintained non-conducting whether input $b$ is high or low, and, as current does not flow in the circuit, the potential of input $b$ is applied to point 11. Evidently, therefore, point 11 assumes a high potential only when inputs $a$ and $b$ both assume a high potential concurrently.

It is to be mentioned that the magnitude of resistor 12 is dependent on the source impedance of input $b$ and the allowable RC time of the circuit, and is chosen accordingly.

Point 11 which assumes a high potential when inputs $a$ and $b$ are high simultaneously and a low potential under all other conditions is connected to a resistor 13 of substantially the same magnitude as resistor 12. Resistor 13 is connected to the cathode of a diode 14 having the input c applied to its anode. An output line 15 for the "or" circuit, comprised by resistor 13 and diode 14, is projected from the cathode of diode 14. When point 11 is at a high potential diode 14 is maintained non-conducting whether input c is high or low, and the output line 15 is maintained at the high potential of point 11. When point 11 is at a low potential diode 14 conducts if input c is high but is maintained non-conducting if input c is low. In the latter case the low potential at point 11 is applied to output line 15. However, in the former case current flows between point 11 and input c and as substantially the total potential drop is across resistor 13, output line 15 assumes the high potential of input c.

It is believed evident, therefore, that the circuit of Fig. 1 operates on a single level, that is, the potential of its output line 15 fluctuates between the high and low potentials of approximately 0 and −20 volts as said potentials are applied to the inputs *a*, *b*, and *c* differentially.

In order to show the state of output line 15 of the circuit of Fig. 1 under all possible conditions, the following chart wherein the letter H designates a high potential and the letter L a low potential, is provided:

| Input *a* | Input *b* | Input *c* | Output line 15 |
|---|---|---|---|
| H | H | H | H |
| L | H | H | H |
| H | L | H | H |
| L | L | H | H |
| H | H | L | H |
| L | H | L | L |
| H | L | L | L |
| L | L | L | L |

Figures 2, 3, 4:
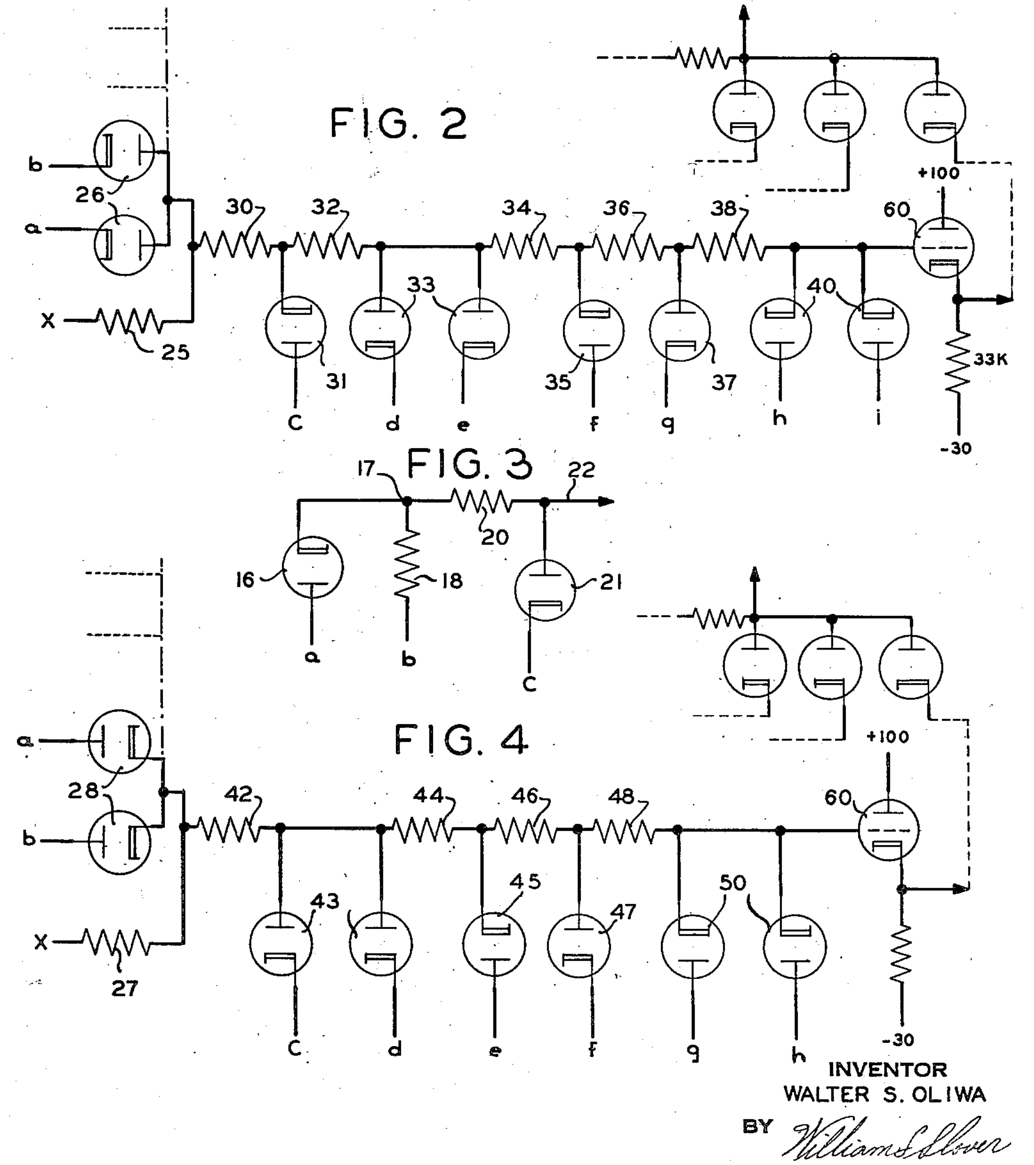
Fig. 2 is a schematic wiring diagram illustrating how the basic circuit of Fig. 1 can be broadened for control by a large number of signals.
Fig. 3 is a schematic wiring diagram of a diode logic circuit adapted to produce a desired output when either one of two inputs has a signal applied thereto simultaneously with the application of a signal to a third input; and, Fig. 4 is a schematic wiring diagram which illustrates the manner in which the circuit of Fig. 3 can be broadened for control by a large number of variables.

The circuit of Fig. 1 is capable of being expanded to handle a greatly increased number of variable inputs, but before describing the manner in which such expansion is carried out, it is deemed desirable first to describe the basic circuit illustrated in Fig. 3.

The circuit of Fig. 3 satisfies the logical equation $(avb).c=H$, that is, it produces a high output whenever input c and one or the other or both of inputs *a* and *b* are high simultaneously. The circuit includes a diode 16 having the input *a* applied to its anode and having its cathode connected at 17 to a resistor 18 to which the input *b* is applied. Diode 16 and resistor 18 comprise an "or" circuit and when input *a* is high, diode 16 conducts if input *b* is low, but is maintained non-conducting if input *b* is high. In the former case, current flows between inputs *a* and *b* and the potential drop across resistor 18 causes point 17 to assume the high potential of input *a*. In the latter case, current does not flow and point 17 assumes the high potential of input *b*.

When input *a* is low, diode 16 is maintained non-conducting regardless of the state of input *b*. Therefore, current does not flow and point 17 assumes the high or low potential of input *b*.

Evidently, as thus far described, point 17 assumes a low potential only when both inputs *a* and *b* are low and is at a high potential under all other conditions.

Point 17 is connected to a resistor 20 of substantially the same magnitude as the resistor 18 which, in turn, is connected to the anode of a diode 21 having the input c applied to its cathode. Diode 21 and resistor 20 comprise an "and" circuit and when input c is high, diode 21 is maintained non-conducting and the potential at point 17, whether high or low, is applied to an output line 22 projected from the anode of diode 21. However, when input c is low, diode 21 conducts if point 17 is at high potential, but is maintained non-conducting if point 17 is at a low potential. Non-conduction of the diode effects application of the low potential at point 17 to output line 22. Conduction of the diode 21 effects current flow between input c and input *a* or *b* through point 17 and, as substantially the total potential drop is across resistor 20 or resistors 18 and 20 in series, output line 22 assumes the low potential of input c.

It is believed evident, therefore, that the circuit of Fig. 3 operates on a single level, that is, the potential of its output line 22 fluctuates between the high and low potentials of substantially 0 and −20 volts as said potentials are applied to the inputs *a*, *b* and *c* differentially.

In order to show the state of output line 22 of the circuit of Fig. 3 under all possible conditions, the following chart, wherein the letter H designates a high potential and the letter L a low potential, is provided.

| Input *a* | Input *b* | Input *c* | Output line 22 |
|---|---|---|---|
| H | H | H | H |
| L | H | H | H |
| H | L | H | H |
| L | L | H | L |
| H | H | L | L |
| L | H | L | L |
| H | L | L | L |
| L | L | L | L |

It will be seen from the description of the circuits of Figs. 1 and 3 that "and" and "or" circuits each include a diode and a resistor and differ only in the manner in which the diode is connected to the resistor. In an "and" circuit the anode of the diode is connected to the resistor so that the said anode assumes a high potential only when a high input is applied to the resistor while the diode is held non-conducting by a high input at its cathode. On the other hand, in an "or" circuit the cathode of the diode is connected to the resistor so that the cathode assumes a low potential only when a low potential is applied to the resistor while the diode is held non-conducting by a low input at its anode. In either circuit ("and" or "or"), the output is taken from the diode electrode connected to the resistor, which electrode, it is to be noted, alternately assumes substantially the same high and low potentials as are applied differentially to the circuit as inputs. Therefore, the said output is applicable, as an input, to another logic circuit operating on the same level as that which produced it. This is illustrated in Fig. 1 wherein the output of an "and" circuit is applied, as an input, to the resistor (13) of an "or" circuit, and in Fig. 3, wherein the output of an "or" circuit is applied, as an input, to the resistor (20) of an "and" circuit. Further, as shown in Figs. 2 and 4, the output of each of a long series of logic circuits operating on the same level is applicable to the resistor of the next circuit of the series as an input.

The basic "or" and "and" circuits illustrated in Figs. 1 and 3 are each controlled by two inputs. The circuits are not limited to this number of inputs however, but may be extended for control by a larger number of inputs as indicated in Figs. 2 and 4. Referring to Fig. 2, the initial one of a series of logic circuits is an "and" circuit controlled by three inputs *a*, *b* and *x*, although, as indicated, other inputs could be provided. One input (*x*) is applied to a resistor 25 which serves in the same manner as resistor 12 described above, and each of the other inputs (*a* and *b*) is applied to the cathode of a diode 26 having its anode connected to the resistor. On inspection it is evident that the anodes of the diodes, from which the output of the circuit is taken, assume a high potential only when the same are maintained non-conducting by high inputs at their cathodes while a high input is applied to resistor 25. Under all other conditions, that is, when one or more of the inputs *a*, *b* and *x* are low, the anodes of diodes 26 assume a low potential.

Referring now to Fig. 4, the initial one of a series of logic circuits is an "or" circuit controlled by three inputs *a*, *b* and *x*, although, as indicated, other inputs could be provided. One input (*x*) is applied to a resistor 27 which serves in the same manner as the resistor 18 described above, and each of the other inputs (*a* and *b*) is applied to the anode of a diode 28 having its cathode connected to the resistor 27.

On inspection it is evident that the cathodes of the diodes 28, from which the output of the circuit is taken, assume a low potential only when all three inputs *a*, *b* and *x* are low. At all other times, that is, when one or more of the inputs *a*, *b* and *x* are high, said cathodes assume a high potential.

It is to be noted from the above that, regardless of the number of inputs applied to each of the described circuits, only one input is applied to a resistor, the remainder being applied to diodes in the appropriate manner.

In order to illustrate the manner in which the basic circuit of Fig. 1 can be extended to satisfy complex logical equations, the circuit for the equation $$[(a.b.xvc)\cdot d.evf]\cdot gvhvi=H$$

is shown in Fig. 2. This circuit includes the initial "and" circuit comprising resistor 25 and diodes 26, an "or" circuit comprising a resistor 30 to which the output of said "and" circuit is applied and a diode 31 to which the input *c* is connected, and an "and" circuit comprising a resistor 32 to which the output of said "or" circuit is applied and a pair of diodes 33 to which the inputs *d* and *e* are connected. The circuit further includes an "or" circuit comprising a resistor 34 connected to the output of "and" circuit 32, 33 and a diode 35 to which the input *f* is applied, and "and" circuit comprising a resistor 36 connected to the output of "or" circuit 34, 35 and a diode 37 to which the input *g* is applied, and an "or" circuit comprising a resistor 38 connected to the output of "and" circuit 36, 37 and a pair of diodes 40 to which the inputs *h* and *i* are applied.

In order to illustrate the manner in which the basic circuit of Fig. 2 can be extended to satisfy complex logical equations, the circuit for the equation $$[(avbvx)\cdot c.dve]\cdot fvgvh=H$$

is shown in Fig. 4. This circuit includes the initial "or" circuit comprising resistor 27 and didodes 28, an "and" circuit comprising a resistor 42 connected to the output of circuit 27, 28 and a pair of diodes 43 to which the inputs *c* and *d* are applied, and an "or" circuit comprising a resistor 44 connected to the output of circuit 42, 43 and a diode 45 to which input *e* is applied. The circuit further includes an "and" circuit comprising a resistor 46 connected to the output of "or" circuit 44, 45 and a diode 47 to which the input *f* is applied, and an "or" circuit comprising a resistor 48 connected to the output of "and" circuit 46, 47 and a pair of diodes 50 to which the inputs *g* and *h* are applied.

Referring to Figs. 2 and 4, it is to be noted that wherever the output of a basic "and" or "or" circuit is utilized as an input to another, it is always applied to the resistor of the latter circuit. As a result, the output potentials of circuits such as said latter circuit are substantially independent of the magnitude of the resistor thereof and are determined by, and are substantially equal to, the potentials applied to the circuit. Thus, in complex circuits such as those illustrated in Figs. 2 and 4 the resistors of the several basic circuits included therein may all be of the same magnitude rather than of increasing magnitude from each circuit to the next as in prior art, multilevel circuits. In fact, if, for example, the source of input *g* in Fig. 2 is of lower impedance than the sources of inputs *f*, *e*, *d*, etc. the resistor 36 may be of less magnitude than the resistors 34, 32, etc. and the circuit will still operate in the desired manner.

Evidently the use of equi-valued resistors in the several stages of circuits of the sort here involved admit of a much shorter RC time for the overall circuit than is possible with multilevel circuits wherein the resistors increase in magnitude from stage to stage. This benefit is even more marked when it is realized that, in a given setting, the magnitude of the resistor in the initial stage of a multilevel circuit and the magnitude of each resistor in applicant's circuit would be equal since the minimum value for each is determined by the same factor, namely, the source impedance of the circuit inputs.

In some instances it is desired that the outputs of two or more diode logic circuits be used as inputs to a third. This necessitates the application of all but one of the outputs of said circuits to diodes of the third circuit, the said one output being applied to the resistor thereof in the manner described above. In order to isolate said diodes from the circuits whose outputs control them and thus to preserve the single level mode of operation of the circuits, each such output is applied to a cathode follower as indicated at 60 in Figs. 2 and 4. Preferably, the cathode resistor of each cathode follower is connected to a source of potential which is somewhat more negative than the low potentials applied to the cathode follower as inputs, say −30 volts. This arrangement ensures that the output potential swing of the cathode follower will be from approximately the same high potential as is applied thereto as an input to at least the low potential applied thereto as an input. Of course, if desired, a cathode follower may be interposed between the output of one circuit and the resistor of another although it is not required.

It is to be mentioned that where the circuit requirements are such as to make it desirable not to apply the output of a basic "and" or "or" circuit to another basic circuit but rather the inversion of the said output, inverter tubes may be interposed between the circuits. For example, if the equation for the circuit of Fig. 1 ($(a.b)vc=H$) were changed to call for a high output when input *c* is high or when inputs *a* or *b* or both are low, then an inverter tube inserted in the circuit at point 11 would modify the illustrated circuit to satisfy the changed conditions. An inverter tube suitable for use in this connection is described in the copending application to W. Burkhart et al., Serial No. 270,876. In similar manner pentode coincidence gates and other vacuum tube elements may be inserted at any point in the diode logic trains.

Whereas the above description and drawings have been directed to the use of vacuum tube diodes, it is to be understood that germanium or selenium diodes or other solid state diodes may be used if the input sources are of sufficiently low impedance to permit of the efficient use of low valued resistors in the circuits or if the ratio of front to back resistance of the diodes is sufficiently high.

While there has been above described but a single embodiment of the invention, it is to be understood that many changes or modifications can be made therein without departing from the spirit of the invention and it is not desired, therefore, to limit the scope of the invention except as pointed out in the appended claims or dictated by the prior art.

I claim:

1. The combination with a plurality of signal sources, of a logic circuit including an "and" circuit and an "or" circuit each comprising a diode, a resistor connected to one electrode of the diode and an output line extended from said electrode, signals from said sources being applied to the other electrode of the diode in each circuit and to the resistor of one circuit, and the output line of said one circuit being applied to the resistor of the other.

2. The combination of an "and" circuit comprising a diode, a first resistor connected to the anode of the diode and an output line extended from said anode, with an "or" circuit comprising a diode, a second resistor of substantially the same magnitude as the first resistor connected to the cathode of the diode and an output line extended from said cathode, the output line of one circuit being directly connected to the resistor of the other circuit.

3. The combination of an "and" circuit comprising a diode, a resistor connected to the anode of the diode and and output line extended from said anode, with an "or" circuit comprising a diode, a resistor connecting the cathode of the diode and the output line of the "and" circuit, and an output line extended from said cathode, said resistors being of substantially the same magnitude.

4. The combination of an "or" circuit comprising a diode, a first resistor connected to the cathode of the diode and an output line extended from said cathode, with an "and" circuit comprising a diode, a second resistor of substantially the same magnitude as the first resistor connecting the anode of the diode and the output line of the "or" circuit, and an output line extended from said anode.

5. A single level circuit for performing a series of the logical processes "and" and "or," including at least one "and" circuit comprising one or more diodes, a first resistor connected to the anodes of said diodes and an output line extended from said anodes; and at least one "or" circuit comprising one or more diodes, a second resistor of substantially the same magnitude as the first resistor connected to the cathodes of said diodes and an output line extended from said cathodes, the output line of each circuit save that for the circuit performing the last logical process of the series being directly connected to the resistor of the succeeding circuit of the series.

6. A single level circuit for performing a plurality of the logical processes "and" and "or" and having two or more branches each including at least one "and" circuit comprises one or more diodes, a first resistor connected to the anodes of said diodes and an output line extending from said anodes, at least one "or" circuit comprising one or more diodes, a second resistor of substantially the same magnitude as the first resistor connected to the cathodes of said diodes and an output line extended from said cathodes, the output line of each circuit of each branch save the last being directly connected to the resistor of the next circuit of that branch, and a cathode follower to which the output line of the last circuit of each branch is applied; one or more diodes, a third resistor of substantially the same magnitude as the first and second resistors connecting like electrodes of the diodes, and an output line extended from said electrodes, the other electrodes of said diodes and said resistor each being connected to a said cathode follower.

7. A single level circuit for performing a plurality of the logical processes "and" and "or" and having two or more branches each including at least one "and" circuit comprising one or more diodes, a first resistor connected to the anodes of said diodes and an output line extending from said anodes, at least one "or" circuit comprising one or more diodes, a second resistor of substantially the same magnitude as the first resistor connected to the cathodes of said diodes and an output line extended from said cathodes, the output line of each circuit of each branch save the last being directly connected to the resistor of the next circuit of that branch, and a cathode follower to which the output line of the last circuit of each branch is applied; one or more diodes, a third resistor of substantially the same magnitude as the first and second resistors connecting like electrodes of the diodes, and an output line extended from said electrodes, the other electrodes of one or more of said diodes each being connected to a said cathode follower.

8. A single level circuit for performing a plurality of the logical processes "and" and "or" and having two or more branches each including at least one "and" circuit comprising one or more diodes, a first resistor connected to the anodes of said diodes and an output line extending from said anodes, at least one "or" circuit comprising one or more diodes, a second resistor of substantially the same magnitude as the first resistor connected to the cathodes of said diodes and an output line extended from said cathodes, the output line of each circuit of each branch save the last being directly connected to the resistor of the next circuit of the branch, and a cathode follower to which the output line of the last circuit of each of one or more branches is applied; one or more diodes, a third resistor of substantially the same magnitude as the first and second resistors connecting like electrodes of the diodes, and an output line extended from said electrodes, the other electrodes of one or more of said diodes each being connected to a said cathode follower.

9. The combination with a plurality of sources of electrical signals of substantially the same order of magnitude of a logic circuit including an "and" circuit and an "or" circuit each comprising a diode, a resistor of substantially the same magnitude connected to one electrode of the diode and an output line extended from said electrode, signals from said sources being applied to the other electrode of the diode in each circuit and to the resistor of one circuit, and the output line of said one circuit being applied directly to the resistor of the other.

References Cited in the file of this patent

UNITED STATES PATENTS

| | | |
|---|---|---|
| 2,580,771 | Harper | Jan. 1, 1952 |
| 2,643,820 | Williams | June 30, 1953 |
| 2,644,887 | Wolfe | July 7, 1953 |
| 2,669,654 | Maggio | Feb. 16, 1954 |
| 2,693,907 | Tootill | Nov. 9, 1954 |
| 2,711,494 | Westerfield | June 21, 1955 |

OTHER REFERENCES

Article: "Diode Coincidence and Mixing Circuits in Digital Computers," by Ling Chan Chen, pages 511–514, Proc. IRE for May 1950.